E. HEIM & C. MATZ.

FINGER NAIL TRIMMER.

No. 9,921. Reissued Nov. 1, 1881.

Attest:
Geo. T. Smallwood Jr.
Walter Allen

Inventor:
Eugine Heim & Celestin Matz
By Knight Bros
attys.

UNITED STATES PATENT OFFICE.

EUGENE HEIM AND CELESTIN MATZ, OF CINCINNATI, OHIO.

FINGER-NAIL TRIMMER.

SPECIFICATION forming part of Reissued Letters Patent No. 9,921, dated November 1, 1881.

Original No. 244,891, dated July 26, 1881. Application for reissue filed October 4, 1881.

*To all whom it may concern:*

Be it known that we, EUGENE HEIM and CELESTIN MATZ, both of Cincinnati, in the county of Hamilton and State of Ohio, have jointly invented a new and useful Finger-Nail Trimmer, of which the following is a specification.

Our device consists, essentially, of a pair of nipping-jaws, which, in their normal position, are sprung apart, and associated therewith a cam-headed lever, mounted in convenient position to be operated by the thumb, and serving to press the said jaws forcibly together. This lever is preferably of flattened form, and may be roughened on its rear surface to serve as a rasp, and from its free extremity may project a hook to serve as a glove-buttoner. A small catch enables the user to lock the parts into compact form for the pocket, and a bow or bail may enable the suspension of the instrument from a belt or watch-chain.

Figure 1:
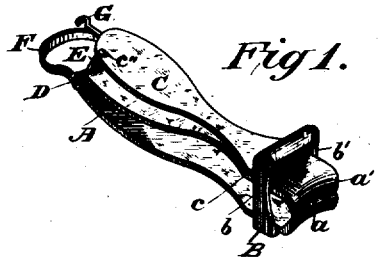
Figure 2:
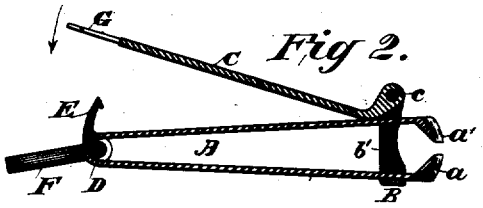
Figure 3:
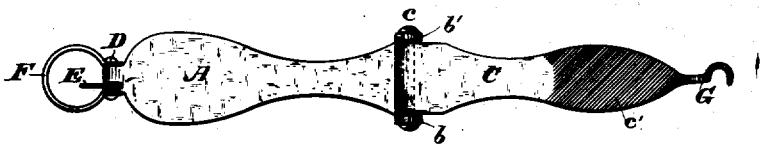

In the accompanying drawings, Figure 1 is a perspective view of the preferred form of our device in the folded condition. Fig. 2 is a section of the same in the plane of action and in open condition. Fig. 3 is a top view thereof with the cam-lever thrown back.

*a a'* represent a pair of nipping-jaws, which we prefer to form of a piece of plate-steel, A, bent to the U form shown in Fig. 2, so that said plate constitutes a spring and holds the jaws normally at some distance asunder, but is capable of being pressed together, so as to bring the cutting or nipping edges of the said jaws in contact. In order to enable this closure of said jaws to be effected with sufficient ease and power, we attach to one jaw a yoke, B, whose perforated cheeks *b b'* receive the pivot *c* of a cam-headed lever, C, the depression of which, as indicated by the arrow in Fig. 2, operates to force the jaws closer together until they meet, as shown in Fig. 1. On the release of lever-pressure, as above, the jaws are sprung apart, so as to facilitate another effective action.

A portion of the rear surface of the cam-lever C may be grooved or roughened, as shown at *c'* in Fig. 3, so as to constitute a file or rasp.

Pivoted at D to the center on which the jaws move in opening and closing is a catch or clasp, E, formed with a hook, which, when said catch is pressed forward, engages in a notch or depression, *c''*, in the cam-lever C, so as to hold the latter in the closed position. (Shown in Fig. 1.) The same pivot D also serves to couple to the instrument a bow or bail, F, by which the trimmer may be suspended from a watch-chain or other object.

The free extremity of the cam-lever may be formed or provided with a hook, G, suitable for buttoning gloves.

By combining cam-lever C with a pair of nipping-jaws—whether formed, as herein shown and described, of a single integral piece of steel constituting its own spring, or in two jaws hinged together, held normally gaping by a spring, and having nipping-edges—we have produced a device adapted to be operated with greater ease and better effect than nail-trimmers heretofore in use having no such cam-lever.

Having thus described our invention, what we claim as new, and desire to secure by Letters Patent, is—

1. A pair of nail-clipping jaws held normally gaping and adapted to be closed by a cam-headed lever, substantially as set forth.

2. A pair of nail-clipping jaws held normally gaping, in combination with a lever for closing the same, substantially as set forth.

3. A pair of nail-clipping jaws, *a a'*, formed of a single integral piece of steel, A, which jaws are held normally gaping by their resilience, and are adapted to be closed by means of a cam-headed lever, C, substantially as set forth.

4. The finger-nail trimmer consisting of U-formed plate A, yoke B, cam-headed lever C, and clasp E.

In testimony of which invention we hereunto set our hands.

EUGENE HEIM.
CELESTIN MATZ.

Witnesses:
GEO. H. KNIGHT,
A. C. SHATTUCK.